(12) United States Patent
Thermos et al.

(10) Patent No.: US 7,752,726 B2
(45) Date of Patent: Jul. 13, 2010

(54) FIXTURE AND INSPECTION METHOD FOR AN ANNULAR SEAL

(75) Inventors: Anthony Constantine Thermos, Greer, SC (US); Ronald Ralph Cairo, Greer, SC (US); Mehmet Demiroglu, Troy, NY (US); Nitin Bhate, Rexford, NY (US)

(73) Assignee: General Electric Company, Schenectady, NY (US)

( * ) Notice: Subject to any disclaimer, the term of this patent is extended or adjusted under 35 U.S.C. 154(b) by 1260 days.

(21) Appl. No.: 11/164,635

(22) Filed: Nov. 30, 2005

(65) Prior Publication Data
US 2007/0119042 A1    May 31, 2007

(51) Int. Cl.
*B23Q 3/00* (2006.01)
(52) U.S. Cl. .................. 29/281.1; 29/281.5; 29/464
(58) Field of Classification Search ............. 29/281.1, 29/464, 889.1, 281.5; 451/285–288; 269/289 R, 269/60
See application file for complete search history.

(56) References Cited

U.S. PATENT DOCUMENTS

| | | | | |
|---|---|---|---|---|
| 3,424,319 A | * | 1/1969 | Darash et al. | 198/341.02 |
| 4,839,997 A | | 6/1989 | Pritchard | |
| 5,660,093 A | * | 8/1997 | Ricci | 82/113 |
| 6,065,378 A | * | 5/2000 | Ricci | 82/128 |
| 6,109,843 A | * | 8/2000 | Descoteaux | 409/134 |
| 2005/0009456 A1 | * | 1/2005 | Sasaki et al. | 451/287 |
| 2007/0119042 A1 | * | 5/2007 | Thermos et al. | 29/464 |

FOREIGN PATENT DOCUMENTS

| DE | 4000121 | 7/1991 |
|---|---|---|
| FR | 2730304 | 8/1996 |
| GB | 1504974 | 3/1978 |

* cited by examiner

*Primary Examiner*—Lee D Wilson
(74) *Attorney, Agent, or Firm*—Hartman & Hartman, P.C.; Gary M. Hartman; Domenica N. S. Hartman

(57) ABSTRACT

A fixture assembly and inspection method by which the internal diameter and/or concentricity of a segmented annular seal can be readily inspected and optionally measured prior to final installation. The fixture assembly has at least two fixture segments supported on a base, by which an annular fixture housing is defined having an outer rim and a groove with a cross-sectional shape corresponding to a cross-sectional shape of the annular seal. The fixture assembly further includes a device or apparatus for assessing at least one dimensional characteristic of the annular seal when installed in the groove of the fixture housing and as the assessing device/apparatus travels along the interior circumference of the fixture housing.

12 Claims, 3 Drawing Sheets

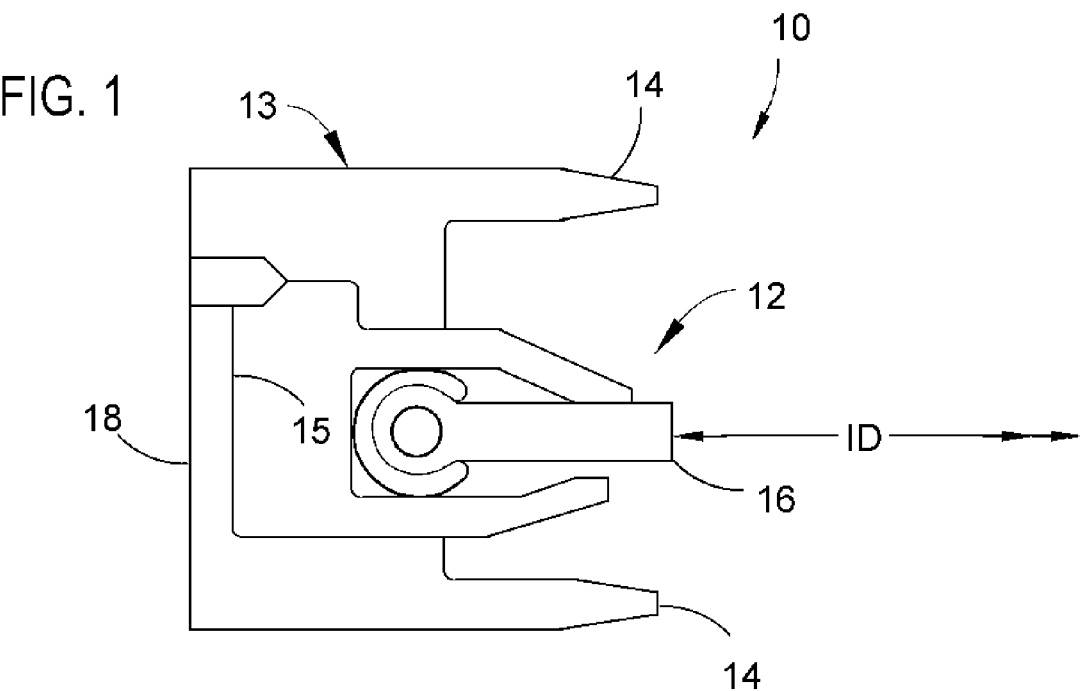
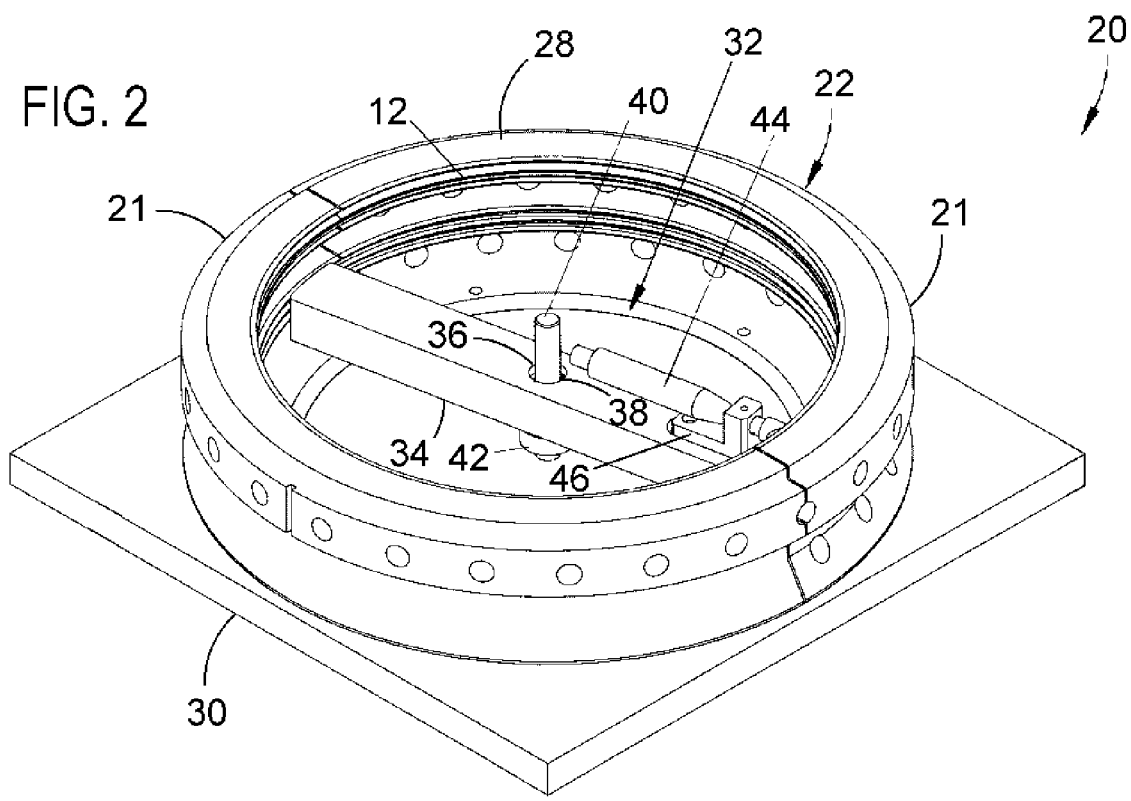

FIXTURE AND INSPECTION METHOD FOR AN ANNULAR SEAL

BACKGROUND OF THE INVENTION

The present invention generally relates to annular seals, such as dynamic seals of the type used in turbomachinery. More particularly, this invention relates to a fixture and inspection method by which dimensional characteristics of an annular seal can be ascertained prior to installation.

Labyrinth-type packings and brush seals are widely used in steam turbines and in aircraft and industrial gas turbines to provide dynamic seals between rotating and static turbine components, such as the rotor and diaphragm inner web of a steam turbine. Traditional labyrinth packing comprises a series of teeth that project radially inward from the inner circumference of a static component and toward but out of contact with the adjacent rotary component, thereby defining a series of partial barriers that create a tortuous axial flow path immediately adjacent the surface of the rotary component. Brush seals comprise fibers or bristles that, similar to the teeth of a labyrinth packing, project radially inward from the inner circumference of a static component toward a rotary component. In contrast to labyrinth packings, brush seals are normally intended to be in rubbing contact with the adjacent circumferential surface of the rotary component, creating a substantially continuous barrier to flow around the circumference of the rotary component. In this regard, brush seals provide a more effective barrier to secondary flow losses, i.e., provide better sealing performance, as compared to labyrinth packings, and therefore have the potential for significantly improving section performance. However, because their sealing performance relies on rubbing contact, the conformance of a brush seal to its design dimensions and tolerances, particularly its internal diameter and concentricity, is important.

Brush seals have been developed that are manufactured as a full-annular structure and then cut to create multiple arcuate segments that can be later reassembled during installation to reestablish the original annular seal structure. In a particular example, a brush seal formed of high strength polymer (e.g., KEVLAR®) is sectioned along its diameter to create two semicircular (180-degree) arcuate segments. The flexible nature of the polymeric material along with residual stresses (in the back structure supporting the bristles) that are redistributed during cutting causes each segment to have altered inner diameter (ID) dimensions. As a result, dimensional inspection of the seal in its "free" (uninstalled) state is difficult and leads to an increased risk of seals that do not conform with design dimensions and tolerances. Though the seal can be inspected after its segments are reassembled during final installation, such an approach can be impractical because of the limited space of typical turbine installations and the difficulty with which such an inspection can be performed in the field.

In view of the above, it would be desirable to verify the dimensional characteristics of a segmented brush seal (as well as other annular seals) without the requirement to install the seal prior to inspection.

BRIEF SUMMARY OF THE INVENTION

The present invention provides a fixture assembly and inspection method by which the internal diameter and/or concentricity of a segmented annular seal can be readily inspected and optionally measured prior to final installation.

According to a first aspect of the invention, the fixture assembly comprises a base and at least two fixture segments supported on the base. When assembled, the fixture segments define an annular fixture housing having an outer rim and a groove adjacent the outer rim and defined in an interior circumference of the fixture housing. The groove has a cross-sectional shape corresponding to a cross-sectional shape of the annular seal. The fixture assembly further comprises means for assessing at least one dimensional characteristic of the annular seal when installed in the groove of the fixture housing and as the assessing means is moved along the interior circumference of the fixture housing.

According to a second aspect of the invention, the inspection method comprises assembling at least two fixture segments on a base to define an annular fixture housing having an outer rim and a groove adjacent the outer rim, defined in an interior circumference of the fixture housing, and having a cross-sectional shape corresponding to a cross-sectional shape of the annular seal. After installing the multiple arcuate segments in the groove of the fixture housing so as to assemble the annular seal therein, at least one dimensional characteristic of the annular seal is assessed by causing an inspection device to move along the interior circumference of the fixture housing.

From the above, it can be appreciated that an advantage of the present invention is that a relatively uncomplicated, split fixture housing is employed that enables a flexible, multi-segment annular seal, such as a polymeric brush seal of a turbomachine, to be dimensionally inspected relative to one or more critical data while the seal is in a simulated installed condition. Another advantage is that the fixture assembly can be portable, permitting the inspection method to be performed in the field. The fixture assembly and inspection method can be employed to quantitatively and/or qualitatively ensure the concentricity of the inner diameter of the seal and/or compliance with maximum and minimum diametrical dimensions of the seal.

Other objects and advantages of this invention will be better appreciated from the following detailed description.

BRIEF DESCRIPTION OF THE DRAWINGS

FIG. 1 represents a cross-sectional view of a seal assembly for a turbomachine and containing a brush seal assembly of a type that can be inspected in accordance with the present invention.

FIG. 2 represents a perspective view of a fixture assembly in accordance with a first embodiment of this invention.

DETAILED DESCRIPTION OF THE INVENTION

Figure 3:
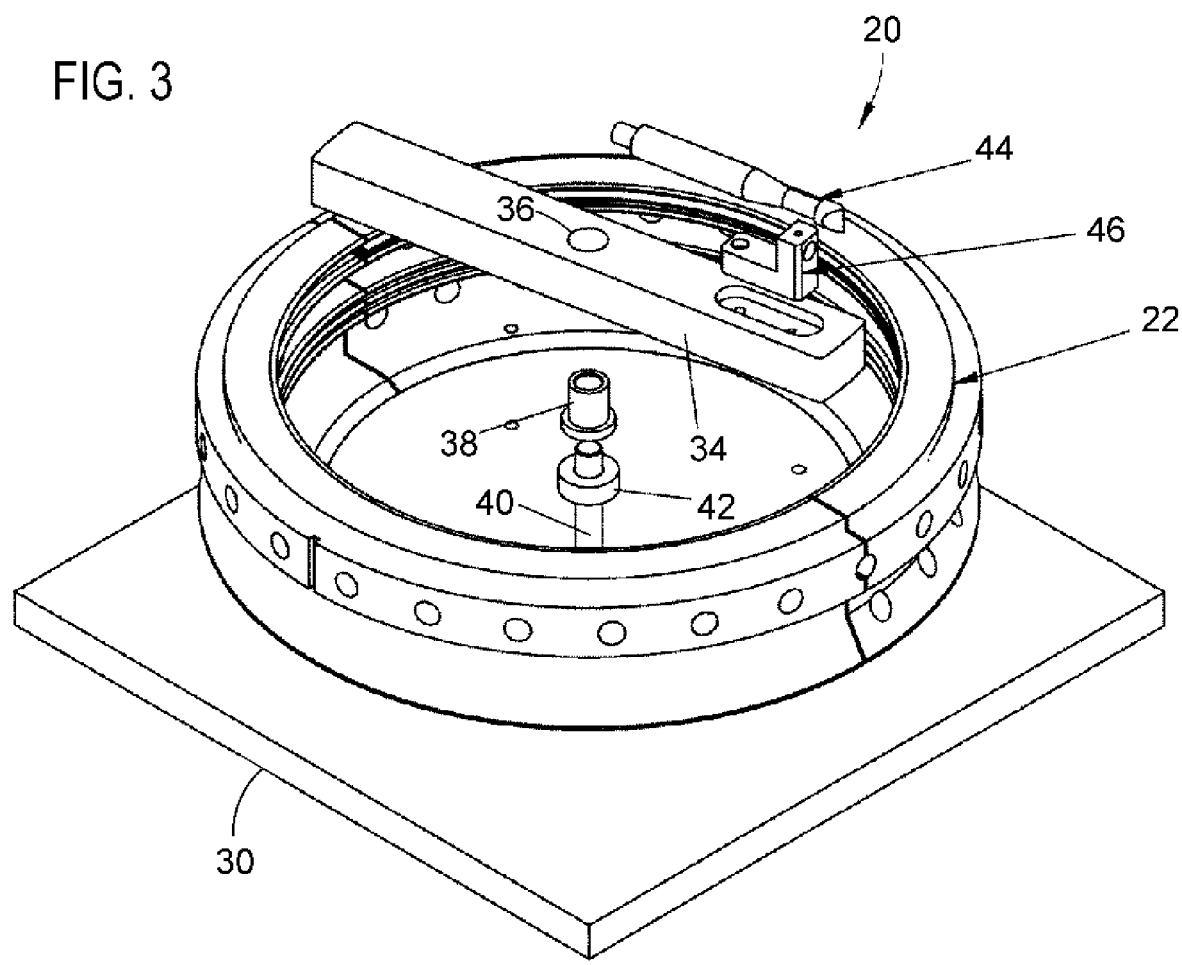
FIG. 3 is an exploded view of the fixture assembly of FIG. 2.

FIG. 1 is a cross-sectional view through an annular seal assembly 10 of a type that can be inspected with fixture assemblies and methods of this invention. The seal assembly 10 is representative of seals used in steam turbines between axially adjacent stages of such turbines to minimize leakage between a rotor to which buckets are mounted and a casing that surrounds the rotor and from which nozzle partitions are supported. As is well known by those skilled in the art, various turbine configurations and applications are possible and within the scope of this invention. As such, the particular type of installation intended for the seal assembly 10 will not be discussed in any detail.

As represented, the seal assembly 10 comprises a housing 13 that contains a brush seal assembly 12 situated within a groove 15 between a pair of teeth 14, the latter being of the type associated with labyrinth-type packings. It should be understood that the seal assembly 10 of FIG. 1 is merely intended to be exemplary of the type of annular seal that can be inspected in accordance with this invention, and that other annular seal types and configurations are also within the scope of the invention. When the seal assembly 10 is installed in its intended turbomachine, the brush seal assembly 12 is axially positioned between the teeth 14 relative to the axis of the turbomachine. As such, the labyrinth teeth 14 serve as backup seals to the brush seal assembly 12, and are therefore preferred but optional components of the seal assembly 10. Consistent with brush seals of the types used in turbomachinery, the brush seal assembly 12 represented in FIG. 1 is adapted to continuously maintain a prescribed gap or predetermined contact with the surface with which it is intended to seal, e.g., the rotor of a turbomachine, thereby effecting a better seal than possible with a labyrinth packing. For this reason, the brush seal assembly 12 is represented as comprising bristles 16 that, when the seal assembly 10 is installed in a turbomachine, project radially inward for rubbing contact with the rotor. As known in the art, the brush seal bristles 16 and the labyrinth teeth 14 may be formed of a variety of materials, with KEVLAR® and other high-temperature, high-strength polymeric materials being notable examples for the brush seal assembly 12 and its bristles 16 if used in advanced technology turbomachinery, while ductile metals are preferred for the teeth 14 and the housing 13 surrounding and supporting the brush seal assembly 12. Other materials that could foreseeably be used in the seal assembly 10 include carbon fiber materials.

Seal assemblies of the type represented in FIG. 1 are typically installed in a groove of a stationary structure of a turbomachine, such as a diaphragm inner web of a steam or gas turbine. When installed in this manner, the outer circumferential surface 18 of the seal assembly 10 is received in the groove so that the teeth 14 and bristles 16 extend radially inward toward the rotor of the turbine. Because the sealing performance of the seal assembly 10 relies largely on maintaining a prescribed gap or pre-determined rubbing contact between the bristles 16 and the rotor, the bristles 16 establish a critical inner diameter (ID) and concentricity of the seal assembly 10.

Figure 4:
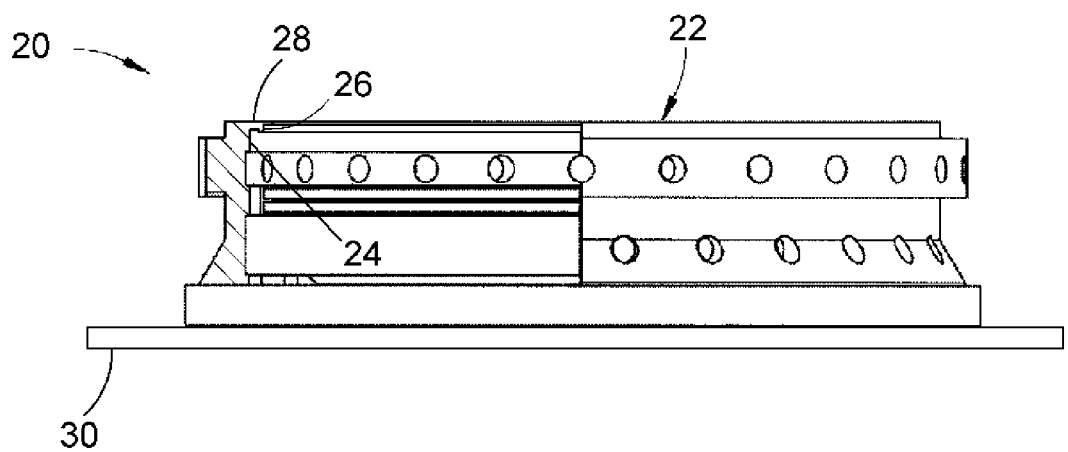
FIG. 4 is a cross-sectional view of the fixture assembly of FIG. 2.

FIGS. 2 through 4 depict a fixture assembly 20 adapted for assessing the inner diameter and/or concentricity of the brush seal assembly 12 of the seal assembly 10 in accordance with a first embodiment of the invention. As represented in FIGS. 2 through 4, the fixture assembly 20 comprises a pair of fixture segments 21 that, when assembled and secured to a base 30, form a fixture housing 22 having an annular shape. The fixture segments 21 and fixture base 30 can be fabricated from a wide variety of materials, and various fastening techniques can be employed to secure the fixture segments 21 to the fixture base 30 so as to provide sufficient strength and rigidity to house the brush seal assembly 12 and support the equipment used to assess the brush seal assembly 12. As evident from FIG. 4, the fixture housing 22 includes a groove 24 located in its interior circumference 26 near an outer rim 28 of the fixture housing 22. The fixture groove 24 is configured and sized to coincide with the diameter, width, and depth of the groove 15 of the seal assembly 10 in which the brush seal assembly 12 will be housed when installed on its intended turbomachine. Furthermore, the rim 28 of the fixture housing 22 is preferably shaped and sized to simulate the upper tooth 14 of the seal assembly 10 in FIG. 1.

In FIGS. 2 and 3, the brush seal assembly 12 is shown as being installed in the groove 24 for inspection by an armature assembly 32. The armature assembly 32 is represented as including a bar 34 pivotally mounted to the fixture base 30 so that at least one of its opposing ends will pass adjacent the groove 24 of the fixture housing 22 and the brush seal assembly 12 when installed in the groove 24. The bar 34 is depicted as having a bore 36 preferably located midway along its length, and a bushing 38 within the bore 36 that receives a pin 40 secured to the fixture base 30 and by which the bar 34 is rotatably supported above the base 30. A clamp 42 secures the bar 34 to the pin 40 to ensure that the bar 34 rotates within a plane perpendicular to the pin 40 and parallel to a plane containing the fixture groove 24 and therefore the brush seal assembly 12 installed in the fixture groove 24.

A micrometer 44 is shown in FIGS. 2 and 3 as being mounted with a holder 46 to one end of the bar 34, so that the micrometer 44 is oriented and positioned to measure the inner diameter (ID) of the brush seal assembly 12 as established by its bristles 1 6. The micrometer 44 can be of any suitable type, such as a dial indicator, comparator, non-contacting measurement device, etc., capable of providing an indication of variations in the ID of the seal assembly 10 as the bar 34 is rotated on its axis of rotation established by the bushing 38 and pin 40. Measurement indications of the micrometer 44 can be provided electronically or visually, such as with a dial. As the bar 34 is rotated on the pin 40, the output of the micrometer 44 can be used to obtain precise quantitative dimensions of the inner diameter of the brush seal assembly 12, or provide a qualitative assessment of conformance ("go-no go") to the minimum and maximum ID dimensions permitted for the assembly 12.

Figure 5:
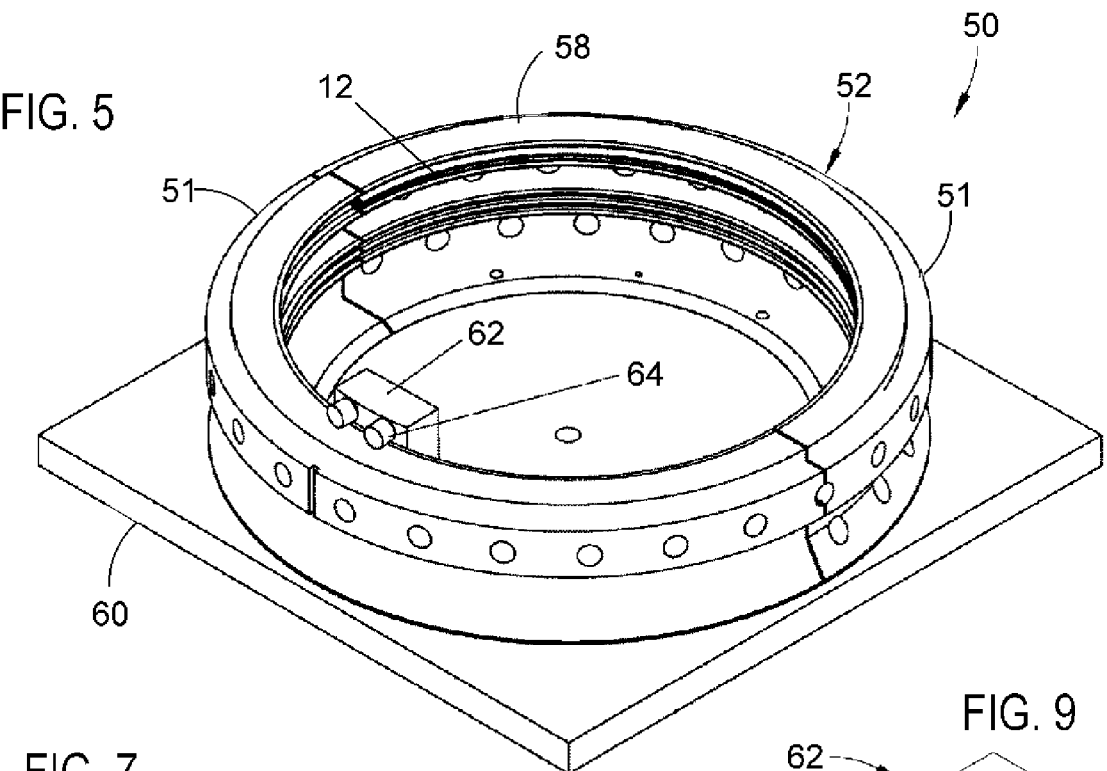
FIG. 5 represents a perspective view of a fixture assembly in accordance with a second embodiment of this invention.
Figure 6:
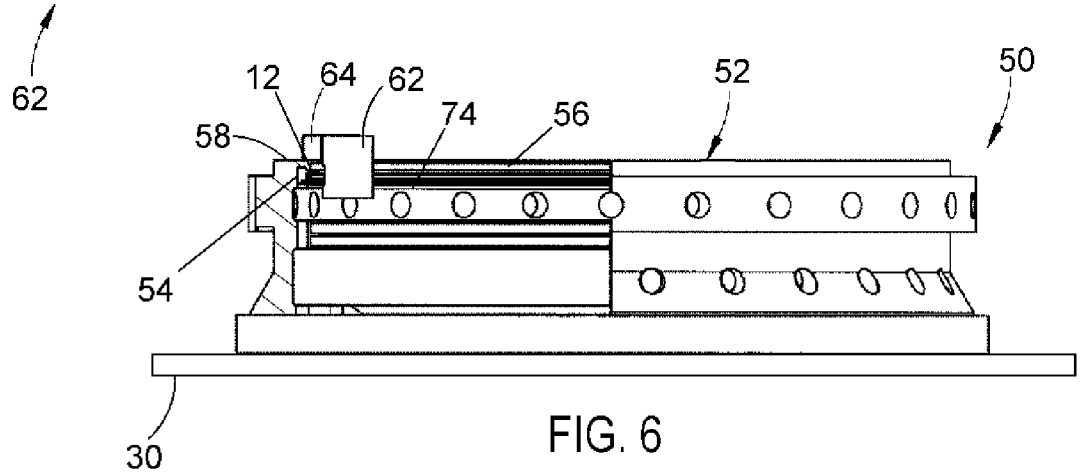
FIG. 6 is a cross-sectional view of the fixture assembly of FIG. 5.

FIGS. 5 and 6 depict a fixture assembly 50 adapted for assessing the inner diameter and/or concentricity of the brush seal assembly 12 in accordance with a second embodiment of the invention. Similar to the fixture assembly 20 of FIGS. 2 through 4, the fixture assembly 50 is represented as comprising a pair of fixture segments 51 that, when assembled and secured to a base 60, yield a annular fixture housing 52. Also consistent with the previous fixture assembly 20, the fixture housing 52 can be seen in FIG. 6 to have an internal groove 54 located in its interior circumference 56 near an outer rim 58 of the housing 52, and configured and sized to coincide with the diameter, width, and depth of the groove 15 that houses the brush seal assembly 10 within the seal assembly 10 of FIG. 1. Furthermore, the rim 58 of the fixture housing 52 can be shaped and sized to simulate the upper tooth 14 of the seal assembly 10 in FIG. 1. In contrast to the embodiment of FIGS. 2 through 4, the fixture assembly 50 of FIGS. 5 and 6 is equipped with an inspection block 62 intended to qualitatively assess the brush seal assembly 12 installed in the groove 54 on the basis of conformance ("go-no go") to the minimum and maximum ID dimensions permitted for the seal assembly 12.

Figure 7:
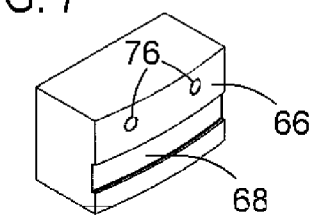
FIG. 7 is a perspective view of an inspection block of the fixture assembly of FIG. 5.

The inspection block 62 is represented in FIGS. 5 and 6 as being supported from the rim 58 of the fixture housing 52 by a pair of rollers 64 rotatably mounted to the block 62 so that a contoured surface 66 of the block 62 abuts the inner circumference of the rim 58 and a rib 74 axially spaced below the rim 58. For this reason, the contoured surface 66 preferably has a radius of curvature approximately equal to that of the interior circumference of the rim 58 and rib 74. As seen in FIG. 7, a pair of bores 76 are present in the contoured surface 66 by which the rollers 64 can be rotatably mounted with shafts (not shown). As also seen in FIG. 7, a channel 68 is defined in the contoured surface 66 beneath the bores 76. The position of the channel 68 relative to the rollers 64 is such that the channel 68 is axially aligned with the brush seal bristles 16 of the brush seal assembly 12 installed in the fixture groove 54, and the width of the channel 68 is sized to accommodate the width of the bristles 16. By precisely sizing the radial depth of the fixture groove 54 relative to the inner circumferences of the rim 58 and rib 74 of the fixture housing 52, as the inspection block 62 travels around the housing 52 with the contoured surface 66 abutting the rim 58 and rib 74, the channel 68 will pass a precise predetermined distance from the bottom of the groove 54 and have a precise position relative to the brush seal assembly 12 installed in the groove 54.

Figure 8:
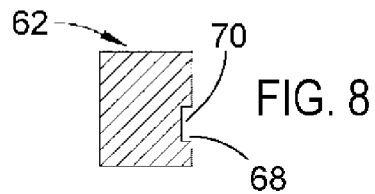
FIGS. 8 and 9 are cross-sectional and perspective views, respectively, of inspection blocks in accordance with alternative embodiments of the invention.

The depth of the channel 68 is sized to enable the block 62 to assess the inner diameter and concentricity of the seal assembly 12 (established by the bristles 16) in one of several ways. For example, the depth of the channel 68 can be sized to coincide with the minimum ID of the brush seal assembly 12, such that by moving the block 62 (e.g., by hand) along the circumference of the fixture housing 52, an out-of-tolerance ID condition can be ascertained by detecting rubbing contact between the bristles 16 and the bottom of the channel 68. Detection of rubbing contacts can be facilitated by placing a contact-sensitive material 70 in the bottom of the groove 68, as depicted in FIG. 8, to assist in detecting if the bristles 16 have contacted the groove 68. The material 70 may be a pressure-sensitive adhesive tape whose adhesion to the groove 68 following inspection will indicate if and to what extent the bristles 16 made interference contact with the bottom of the groove 68. Another alternative for the material 70 is a powder such as chalk applied to the bottom of the groove 68, by which a brush seal assembly 12 with an undersized ID can be detected by visually inspecting its bristles 16 to see if any powder has been transferred to the bristles 16. A second inspection block 62 whose channel 68 has a depth sized to coincide with the maximum ID of the seal assembly 10 is then used to determine an out-of-tolerance maximum ID condition by the absence of rubbing contact between the bristles 16 and the bottom of the channel 68.

Figure 9:
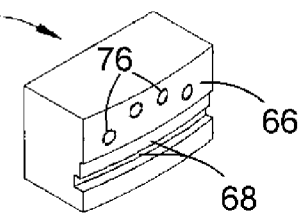

FIG. 9 depicts an alternative configuration for the groove 68, in which a step 72 is present to define two different depths corresponding to the minimum and maximum allowable ID's for the brush seal assembly 12. As shown in FIG. 9, two staggered sets of bores 76 are provided in which the two rollers 64 can be selectively mounted to axially align one of the channel depths with the brush seal bristles 16 of the brush seal assembly 12 installed in the fixture groove 54. With this approach, a single inspection block 62 is able to simultaneously detect out-of-tolerance minimum and maximum ID conditions. This approach can also make use of the contact-sensitive material 70 of FIG. 8.

While the invention has been described in terms of a particular embodiment, it is apparent that other forms could be adopted by one skilled in the art. For example, while the fixture housings of the invention are shown and described as comprising two fixture segments, the housings could be divided into any number of segments. Furthermore, though the invention has been described in reference to a brush seal for a turbomachine, the invention can find application for use with other types of annular-shaped seals. Therefore, the scope of the invention is to be limited only by the following claims.

What is claimed is:

1. A fixture assembly for inspecting an annular seal comprising multiple arcuate segments, the fixture assembly comprising:
    a base;
    at least two fixture segments supported on the base and that when assembled define an annular fixture housing having an outer rim and a groove adjacent the outer rim and defined in an interior circumference thereof, the groove having a cross-sectional shape corresponding to a cross-sectional shape of the annular seal; and
    means for assessing at least one dimensional characteristic of the annular seal when installed in the groove of the fixture housing, the assessing means being movable along the interior circumference of the fixture housing;
    wherein the assessing means comprises a micrometer and means for rotating the micrometer about a central axis of the fixture housing and in proximity to the groove of the fixture housing.

2. The fixture assembly according to claim 1, wherein the at least one dimensional characteristic determined by the assessing means comprises an inner diameter of the annular seal when installed in the groove of the fixture housing.

3. The fixture assembly according to claim 1, wherein the at least one dimensional characteristic determined by the assessing means comprises concentricity of an inner diameter of the annular seal when installed in the groove of the fixture housing.

4. A method of inspecting an annular seal using the fixture assembly according to claim 1, the method comprising installing the annular seal in the groove of the fixture housing, wherein the annular seal comprises a brush seal assembly of a turbomachine.

5. The fixture assembly according to claim 1, wherein the rotating means comprises a beam pivotally mounted to the base, the micrometer being mounted to the beam.

6. A fixture assembly for inspecting an annular seal comprising multiple arcuate segments, the fixture assembly comprising:
    a base;
    at least two fixture segments supported on the base and that when assembled define an annular fixture housing having an outer rim and a groove adjacent the outer rim and defined in an interior circumference thereof, the groove having a cross-sectional shape corresponding to a cross-sectional shape of the annular seal; and
    means for assessing at least one dimensional characteristic of the annular seal when installed in the groove of the fixture housing, the assessing means being movable along the interior circumference of the fixture housing;
    wherein the assessing means comprises a movable member and means for movably supporting the movable member adjacent the groove of the fixture housing as the movable member travels along the interior circumference of the fixture housing; and
    wherein the movable member comprises an inspection channel in a radially-outward surface thereof, the inspection channel having a depth corresponding to an inner diameter tolerance limit of the annular seal.

7. The fixture assembly according to claim 6, wherein the supporting means supports the movable member from the outer rim of the fixture housing.

8. The fixture assembly according to claim 6, wherein the supporting means comprises rollers in rolling contact with the outer rim of the fixture housing.

9. A method of inspecting an annular seal using the fixture assembly according to claim 6, the method comprising installing the annular seal in the groove of the fixture housing, wherein the annular seal comprises a brush seal assembly of a turbomachine.

10. The fixture assembly according to claim 6, further comprising means located in the inspection channel for indicating rubbing encounters with the annular seal as the movable member travels along the inner circumference of the fixture housing.

11. A fixture assembly for inspecting an annular seal comprising multiple arcuate segments, the fixture assembly comprising:

a base;

at least two fixture segments supported on the base and that when assembled define an annular fixture housing having an outer rim and a groove adjacent the outer rim and defined in an interior circumference thereof, the groove having a cross-sectional shape corresponding to a cross-sectional shape of the annular seal; and means for assessing at least one dimensional characteristic of the annular seal when installed in the groove of the fixture housing, the assessing means being movable along the interior circumference of the fixture housing;

wherein the assessing means comprises a movable member and means for movably supporting the movable member adjacent the groove of the fixture housing as the movable member travels along the interior circumference of the fixture housing; and wherein the movable member comprises an inspection channel in a radially-outward surface thereof, the inspection channel having at least two depths corresponding to minimum and maximum inner diameter tolerance limits of the annular seal.

12. A method of inspecting an annular seal using the fixture assembly according to claim 11, the method comprising installing the annular seal in the groove of the fixture housing, wherein the annular seal comprises a brush seal assembly of a turbomachine.

* * * * *